April 12, 1927.  1,624,174
J. M. LUCARELLE ET AL
POWER TRANSMITTING DEVICE
Filed May 29, 1924    2 Sheets-Sheet 1
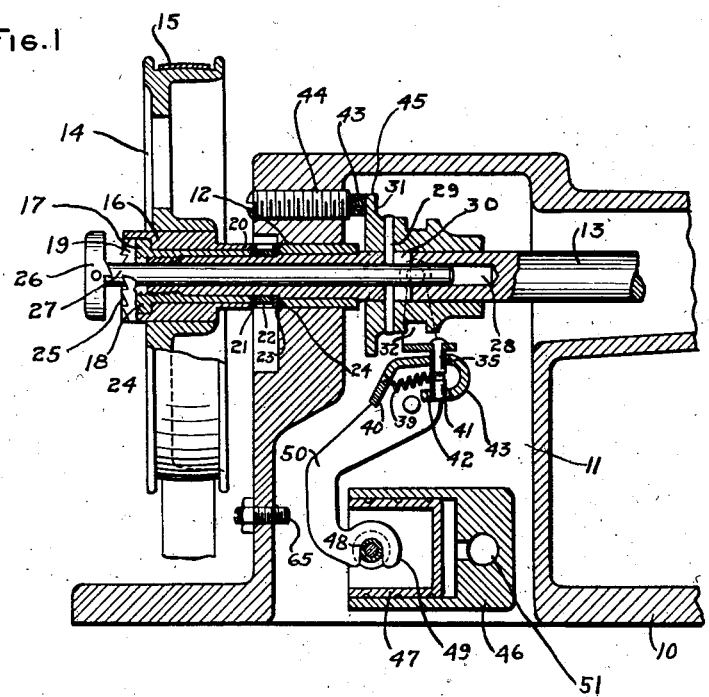
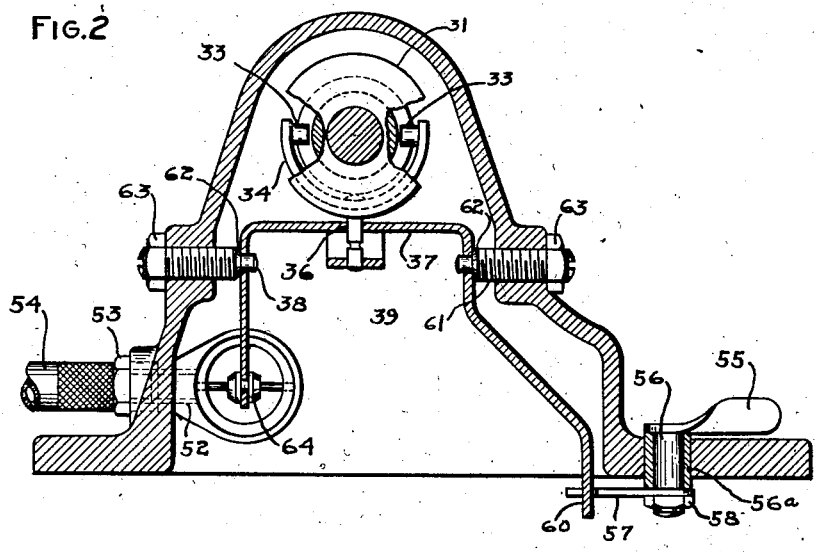
INVENTORS:
JOSEPH M. LUCARELLE
AND VICTOR L. FRYKMAN
BY
ATTORNEY April 12, 1927.

J. M. LUCARELLE ET AL 1,624,174

POWER TRANSMITTING DEVICE

Filed May 29, 1924   2 Sheets-Sheet 2

INVENTORS:
JOSEPH M. LUCARELLE
AND VICTOR L. FRYKMAN
BY
ATTORNEY

Patented Apr. 12, 1927.

1,624,174

UNITED STATES PATENT OFFICE.

JOSEPH M. LUCARELLE AND VICTOR L. FRYKMAN, OF BRIDGEPORT, CONNECTICUT, ASSIGNORS TO DICTAPHONE CORPORATION, OF BRIDGEPORT, CONNECTICUT, A CORPORATION OF NEW YORK.

POWER-TRANSMITTING DEVICE.

Application filed May 29, 1924. Serial No. 716,696.

This invention relates to power transmitting devices, and, in the form herein shown as illustrative of the invention, it is applied to phonographs, more particularly dictation machines.

In the accompanying drawings,

Figure 1 is a longitudinal section showing the driving means, the driven means, the clutch between the driving means and the driven means, and the means for operating the clutch, all in accordance with the present invention.

Fig. 2 is a transverse section showing the clutch-operating yoke, automatic means for operating the yoke, manual means for operating the yoke, and means for adjusting the yoke.

Figure 3:
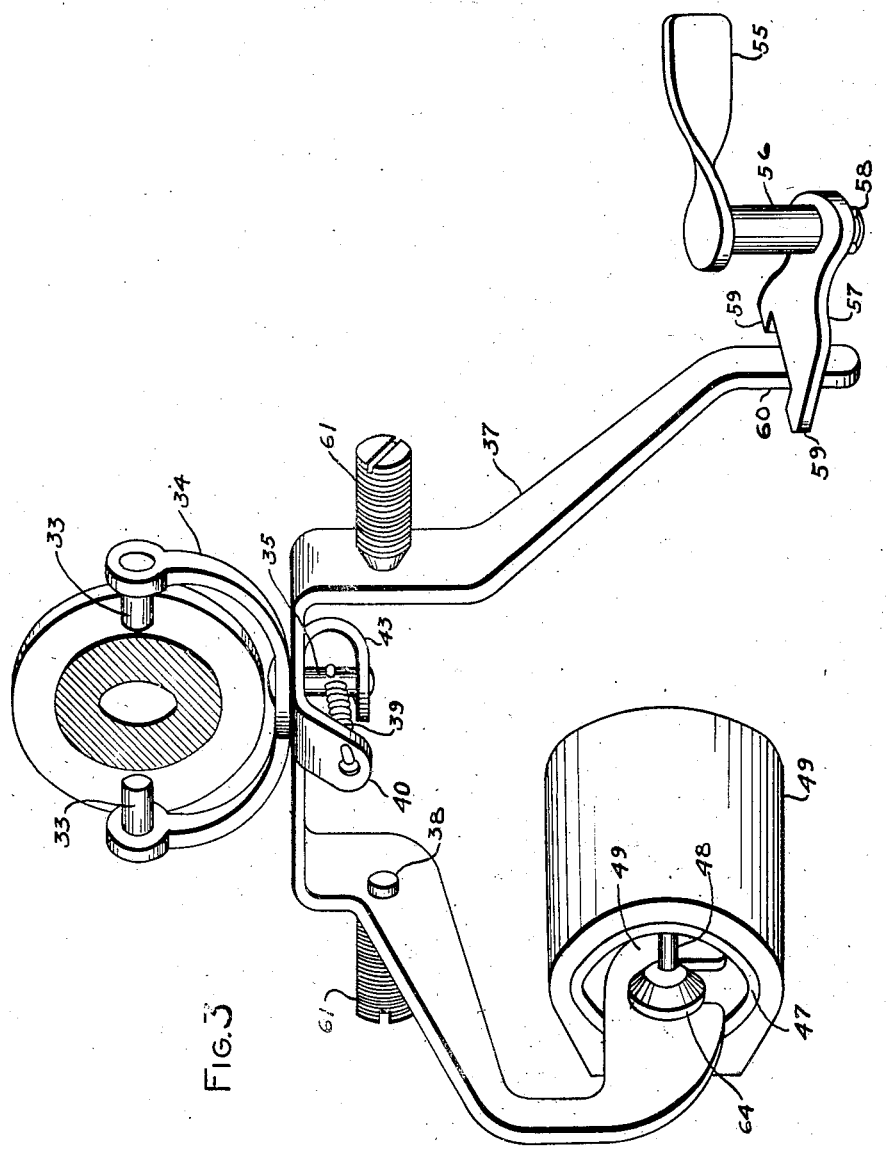
Fig. 3 is a perspective view showing the parts shown in Fig. 2.

In the type of dictation machine selected for the purpose of illustrating the present invention, the top-board 10 is provided with a housing 11 having at one side a bearing 12 for supporting the driven shaft 13 which supports the record-tablet mandrel (not shown).

At the outside of the housing 11, there is provided a pulley or other driving member 14 which is engaged by a belt 15 extending to the pulley of a motor (not shown), which furnishes the power to rotate the shaft 13. This pulley is provided with a cast-in hub 16 and is rotatably mounted upon a bearing-collar 17 which is carried by the end of the driven shaft 13. The collar 17 is screw-threaded on the end of the shaft 13 and has a head 18 located in a socket 19 provided in the hub 16 of the pulley. The collar 17 is adjusted to its proper position with a key, provided for the puropse and this draws the flange 20 of the hub so close to a washer 21 mounted on the shaft 13 that the pulley is held against lateral movement, yet is freely rotatable on the collar 17. The washer 21 engages a pinion 22 having at its other side, a washer 23 which engages a shoulder 24 on the shaft 13. By tightening the collar 17 in place, as above described, the washer 21, the pinion 22 and the washer 23 are firmly pressed against the shoulder 24 and are thus held on the shaft to turn therewith.

The pinion 22 is adapted to drive other parts of the machine, such as the feed-screw for effecting the traveling movement to the sound-box carriage of the dictation machine.

The clutch between the pulley 14 and the shaft 13 preferably comprises a plurality of clutch-teeth 25 provided on the hub 16 of the pulley, a companion clutch-disc 26 having one or more teeth, a rod 27 slidably mounted in a hollowed portion 28 of the shaft 13 and carrying the disc 26, and a pin 29 in the rod 27 which slides in a slot 30 in the shaft 13, and acts as a spline to positively couple the rod 27 and the shaft 13 for simultaneous rotation, yet to allow the rod 27 to move longitudinally of the shaft. When the clutch-disc 26 is in the position shown in Fig. 1, the pulley operates idly without rotating the shaft. However, when the rod 27 is moved to the right as seen in Fig. 1, a driving tooth on the clutch-disk 26 thereon positively engages with one of the teeth 25 on the pulley-hub 16 to drive the shaft 13.

In order to shift the clutch-disk 26 for the purpose of connecting the pulley to the driven shaft 13, a collar 31 is slidably mounted on the shaft 13 and has the pin 29 in the rod 27 secured in it. A groove 32 in the collar 31 is adapted to be engaged by pins 33 which are carried by a yoke 34 connected to the clutch-shifting mechanism. The yoke 34 is secured to a pin 35 which passes freely through an aperture 36 in a sheet-metal clutch-operating bail 37. This bail 37 is fulcrumed on studs 38 mounted in the housing 11.

To prevent topping of the tooth or teeth of the clutch disc 26, when the latter is moved into engagement with the teeth 25 on the pulley 14, a spring 39, carried by an ear 40 extending from the bail 37, engages the pin 35 of the yoke 32 at 41 as shown in Fig. 1. This spring 39, because of the freedom of movement allowed between the pin 35 and the aperture 36 in the bail 37, acts as a yielding connection between the yoke 34 and the bail 37. Should the tooth or teeth of the clutch-disk 26 engage the top or tops of the teeth 25 on the hub 16, the grooved-collar 31 cannot reach the full limit of its movement, therefore, the spring 39 yields and allows the bail 37 to reach the full limit of its movement without producing excessive friction between the pins 33 of the yoke 34 and the grooved-collar. This excessive friction would be sufficient to stop the rotation of the shaft 13 if the spring 39 were not provided. The power stored up in the spring 39, when the above condition exists, is sufficient to cause the clutch-disk teeth to move into full engagement with the teeth 25 as soon as the pulley 14 turns. At this time the tooth or teeth of the clutch-disk 26, slip off the top or tops of the teeth 25 on the pulley because the spring 39 does not produce sufficient friction between the clutch-disk teeth and the pulley teeth to hold them, with their tops engaging, against such slipping movement. The lower end of the pin 35 is guided in a slot 42 in an arm 43 formed integral with the bail 37. The slot 42 limits the movement of the pin 35 during the movement of the parts to unclutched position, that is, to the position shown in Fig. 1.

When the clutch is released, the shaft 13, because of weight of the mandrel which it carries and the record which the mandrel supports, has a tendency to rotate by momentum until it gradually slows down. To avoid this condition, which causes considerable waste of record-surface, there is provided a brake for the shaft 13. This brake comprises a brake-shoe 43 carried by an adjustable screw 44 threaded in the housing 11, and a brake-disk 45 preferably formed integral with the grooved-collar 31. When the collar 31 is moved to the left, as seen in Fig. 1, to cause the clutch to be disconnected, the brake-disk 45 engages the brake-shoe 43 which is preferably formed of leather, and sufficient friction is produced to quickly bring the shaft 13 and the mandrel to a stop. In fact, the mandrel stops almost instantaneously with the unclutching of the shaft from the pulley 14. As the leather brake-shoe 43 wears, it is kept in proper working position by moving it closer to the brake-disk by rotation of the screw 44 which carries it.

The yoke 37 is operable to cause the clutch to be moved to either clutched or unclutched position by automatic means and also by manual means. The automatic means comprises a cylinder 46 secured to the housing 11, as hereinafter described, and a piston 47 slidably mounted in the cylinder. The piston 47 has a transverse rod 48 adapted to operate the hook-shaped end 49 of an arm 50 forming part of the yoke 37. The cylinder 46 is provided with an inlet opening 51 which receives a nipple 52 screw-threaded in the cylinder. A head 53 on the nipple 52 is located at the outside of the housing 11 and holds the cylinder 46 to the housing, as shown in Fig. 2. The nipple 52 is co-extensive with a tube 54 which leads to a companion cylinder and piston or similar air compressing device operable at the will of the operator. Usually, this device is placed under the operator's foot so that operation of the companion cylinder and piston compresses the air in the tube 54 and forces the piston 47 outwardly from the cylinder 46, to operate the clutch. Upon release of the companion piston and cylinder, spring operated means in said cylinder produces a suction which draws the piston 47 in the cylinder 46 inwardly and causes the clutch to be disconnected.

By mounting the piston 47 and the cylinder 46 in the housing 11 directly beneath the clutch operating mechanism, the number of parts required for the operating mechanism is reduced to a minimum and much lost-motion is avoided.

In order to operate the bail 37 of the clutch mechanism manually, a finger-piece 55 is provided in a position where it is accessible to the operator. The finger-piece 55 is preferably located on the top-board 10 of the machine and is provided with a stud 56 also secured to an arm 57 by a nut 58. The stud 56 is rotatably mounted in a bushing 56ª provided on the top-board 10. The arm 57 is provided with a pair of projections 59 adapted to engage a forwardly and downwardly extending arm 60 formed integral with the bail 37. The space between the projections 59 on the arm 57 is such as to allow free movement of the bail 37 with its arm 60, both to clutching and unclutching positions, without necessarily moving the arm 57. When it is desired to shift the clutch manually, the finger-piece 55 is rocked so that one of the projections 59 will engage the arm 60 of the bail 37 and rock the bail to move the clutch to operative position, the lost-motion between the projection 59 and the arm 60 being taken up before the latter is operated. The same thing occurs when it is desired to move the clutch to ineffective position manually, only in this case, the other projection 59 comes into operation.

The bail 37 is adjustably mounted for the purpose of adjusting the yoke 34 transversely to bring it into proper relation with the grooved-collar 31. This is accomplished by forming the studs 38, which engage the bail 37, integral with screws 61 threaded in the housing 11. Each of the studs 38 is provided with a shoulder 62 for engaging the adjacent downwardly extending arms of the bail 37. When the screws 61 are adjusted, the bail is moved to the front or rear, as desired. The screws 61 are locked in the desired position by lock-nuts 63. To accommodate this forward and backward movement of the bail, the projections 59 on the lever 57 are made sufficiently long to engage the arm 60 of the bail 37 in all adjustable positions of the latter, and the hook-shaped end 49 of the bail-arm 50 is adapted to slide relative to the pin 48 of the piston 47.

Instead of directly engaging the pin 48, the hook-shaped end 49 of the arm 50 engages a grooved-collar 64 slidably mounted on the rod 48 to prevent the piston from turning in the cylinder, and to allow free movement of the end 49 in its vertical movements.

The outward movement of the piston and the bail 37 is limited by a stop 65 which is preferably adjustable so that the movement of the bail will be just sufficient to cause the clutch-teeth to properly engage without the bottoms engaging, which would produce friction between the pins 33 of the yoke 34 and the grooved-collar 31 unless this provision were made.

While one embodiment has been shown to illustrated the invention, it should be understood that other forms of device will suggest themselves to those skilled in the art, and that variations and modifications of the invention may be made and portions of the improvement may be used without others.

Having now described this invention, what is claimed as new and for which it is desired to obtain Letters Patent, is:

1. In combination, a housing; a driven-shaft supported by the housing; clutch-controlling means mounted within the housing; and a cylinder and piston mounted within the housing for operating said clutch-controlling means.

2. In combination, a housing; a driven-shaft supported by the housing; clutch-controlling means mounted within the housing; power-operated means mounted within the housing for operating said clutch-controlling means; and manually operated means for operating said clutch controlling means.

3. In combination, a housing; a driven-shaft supported by the housing; clutch-controlling means mounted within the housing; and pneumatically-operated means mounted within the housing for operating said clutch-controlling means.

4. In combination, a housing; a driven-shaft supported by the housing; clutch-controlling means mounted within the housing; and comprising a bail; and automatic means acting directly on the bail to operate the same.

5. In combination, a housing; a driven-shaft supported by the housing; clutch-controlling means mounted within the housing and comprising a bail; and power-operated means acting directly on the bail to operate the same.

6. In combination, a housing; a driven-shaft supported by the housing; clutch-controlling means mounted within the housing and comprising a bail; and pneumatically-operated means acting directly on the bail to operate the same.

7. In combination, a housing; a driven-shaft supported by the housing; clutch-controlling means mounted within the housing and comprising a bail; automatic means acting directly on the bail to operate the same; and manually operable means acting directly on said bail independently of said automatic means.

8. In combination, a housing; a driven-shaft supported by the housing; clutch-controlling means mounted within the housing; and a piston and cylinder mounted within the housing, the piston being directly connected to the clutch-controlling means.

9. In combination, a housing; a driven-shaft supported by the housing; clutch-controlling means mounted within the housing; a cylinder and piston mounted within the housing, said piston being directly connected to the clutch-controlling means to operate the same; and a finger-piece for manually operating the clutch-controlling means.

10. In combination, a housing; a driven-shaft supported by the housing; clutch-controlling means mounted within the housing and comprising a bail; and a cylinder and piston mounted within the housing, said piston being directly connected to the bail to operate the same.

11. In combination, a housing; a driven-shaft supported by the housing; clutch-controlling means mounted within the housing; a cylinder and piston mounted within the housing, said piston being directly connected to the clutch-controlling means; and a finger-piece mounted outside the housing and extending into the housing to operate said clutch-controlling means.

12. In combination, a housing; a driven-shaft supported by the housing; a clutch-controlling means mounted within the housing and comprising a bail; a cylinder and piston mounted within the housing, said piston being directly connected to said bail to operate the same; and a finger-piece mounted outside the housing and extending into the housing to directly operate said bail independently of said piston.

13. In combination, relatively movable co-operating clutch elements; means to move said elements into co-operative relation; and yieldable means interposed between the last-named means and said element to yield when movement of said elements to co-operate relation is opposed.

14. In combination, relatively movable co-operating clutch elements; means manually or automatically operable to move said elements into co-operative relation; and yieldable means interposed between the last-named means and said clutch elements adapted to yield when movement of said elements to co-operate relation is opposed.

15. In combination, relatively movable co-operating clutch elements; a bail to move said element into co-operative relation; and yieldable means interposed between said bail and said elements to yield when movement of said elements to co-operative relation is opposed.

16. In combination, relatively movable co-operating clutch elements; a bail to move said element into co-operative relation; means for positively operating said bail; and yieldable means interposed between said bail and said elements adapted to yield when movement of said elements to co-operative relation is opposed.

17. In combination, co-operating clutch elements: a grooved-collar connected to one of said elements whereby said element is moved into co-operative relation with the other said element; a yoke engaging said collar; a bail carrying said yoke; and yieldable means between said yoke and said bail adapted to yield when clutch-closing movement of said collar is opposed.

18. In combination, co-operating clutch elements; a collar connected to one of said elements whereby said element is moved into co-operative relation with the other of said elements; a yoke engaging said collar; a bail carrying said yoke; and a spring between said yoke and said bail adapted to yield when clutch-closing movement of said collar is opposed.

19. A clutch-controlling member comprising a bail having the horizontal portion adapted to support a clutch-operating yoke, a downwardly extendingly rearward portion adapted to be pneumatically operated, and a downwardly extending forward portion adapted to be manually operated.

20. A clutch-mechanism, comprising a clutch-operating yoke; a sheet-metal bail for supporting the yoke; and means for operating the bail.

21. In combination, a clutch-operating yoke; a bail for supporting the yoke; and means for adjusting the bail.

22. In combination, a clutch-controlling yoke; a sheet-metal bail for supporting the yoke; and means for adjusting the bail longitudinally to vary the position of the yoke.

23. In combination, a driving-member; a driven-member; a clutch between the driving-member and the driven-member; a frame for supporting said members; a movable collar adapted to control the clutch; an adjustable brake mounted in said frame; and a flange on said movable collar adapted to engage with said brake.

24. In combination, a housing; a driven shaft supported by the housing; clutch controlling means mounted within the housing and comprising a bail; and automatic means located within the housing and acting on the bail to operate the same.

25. In combination, a housing; a driven shaft supported by the housing; clutch controlling means mounted within the housing and comprising a bail; and power-operated means located within the housing and acting on the bail to operate the same.

26. In combination, a housing; a driven shaft supported by the housing; clutch controlling means mounted within the housing and comprising a bail; and pneumatically operated means located within the housing and acting on the bail to operate the same.

27. In combination, a housing; a driven shaft supported by the housing; clutch controlling means mounted within the housing and comprising a bail; automatic means mounted within the housing and acting on the bail to operate the same; and means adapted to operate the bail independently of said automatic means.

28. In combination, a housing; a driven shaft supported by the housing; clutch controlling means mounted within the housing; and a piston and cylinder mounted within the housing, said piston being connected to the clutch controlling means.

29. In combination, cooperating clutch elements; automatic means for moving said clutch elements into cooperative relation; and means normally idle when the automatic means is operated and entirely independent from said automatic means for bringing said clutch elements into cooperative relation.

30. In combination, cooperating clutch elements; automatic means for moving said clutch elements into cooperative relation; and means normally idle when the automatic means is operated and entirely independent from said automatic means for bringing said clutch elements into cooperative relation or out of operative relation depending upon the direction in which said manually operable means is operated.

Signed at Bridgeport, in the county of Fairfield and State of Connecticut, May, 1924.

JOSEPH M. LUCARELLE.
VICTOR L. FRYKMAN.